(12) United States Patent
Whiffen et al.

(10) Patent No.: US 7,181,320 B2
(45) Date of Patent: Feb. 20, 2007

(54) SYSTEMS, METHODS AND COMPUTER PROGRAM PRODUCTS FOR CONTINUOUS EMISSIONS MONITORING ON-LINE

(75) Inventors: Richard C. Whiffen, North Wales, PA (US); Timothy P. McDade, Doylestown, PA (US); Xiaoda Gong, Collegeville, PA (US); William H. Lawson, Chester Springs, PA (US); Khoi T. Ha, Fleetwood, PA (US)

(73) Assignee: General Electric Company, Schenectady, NY (US)

( * ) Notice: Subject to any disclaimer, the term of this patent is extended or adjusted under 35 U.S.C. 154(b) by 77 days.

(21) Appl. No.: 10/709,543

(22) Filed: May 12, 2004

(65) Prior Publication Data

US 2005/0267642 A1 Dec. 1, 2005

(51) Int. Cl.
G06F 19/00 (2006.01)
(52) U.S. Cl. ............. 700/286; 700/108; 700/110; 60/203.1; 702/60
(58) Field of Classification Search ............. 700/286, 700/108, 110; 60/203.1; 702/60
See application file for complete search history.

(56) References Cited

U.S. PATENT DOCUMENTS 6,208,948 B1 * 3/2001 Klingler et al. ............. 702/183
6,437,692 B1 * 8/2002 Petite et al. ................. 340/540
6,553,336 B1 * 4/2003 Johnson et al. ............. 702/188
6,904,385 B1 * 6/2005 Budike, Jr. ................. 702/182
2002/0059033 A1 * 5/2002 Batug et al. ................. 702/24

OTHER PUBLICATIONS

"A Digital Measurement Station for RF-Conducted Emissions Monitoring" -Capua et al, IEEE Transactions on Instrumentation and Measurement, vol. 51, No. 6, IEEE Dec. 2002.*

* cited by examiner

Primary Examiner—Leo Picard
Assistant Examiner—Michael D. Masinick
(74) Attorney, Agent, or Firm—Sutherland Asbill & Brennan LLP

(57) ABSTRACT

Systems, methods and computer program products provide secure access to real-time emissions data from one or more power generating plants via a web-based interface. The user provides log-in information to gain a predefined level of access based on the inputted log-in information, and may access emissions data of one or more power generating plants located remotely with respect to the user. The user can utilize any suitable computing device with a suitable browser application to access the emissions data. Accordingly, the system is highly scalable, in both users and power generating plants being monitored.

16 Claims, 16 Drawing Sheets

| State Field Value | Text Color | Priority |
|---|---|---|
| Ok Data | Green | 1 |
| H/W Fail | *HRed | 4 |
| Data Error | Maroon | 5 |
| Task Error | *HRed | 6 |
| Dscrd Data | Orange | 6 |
| Proc Off | Green | 2 |
| Comm Fail | *HRed | 3 |
| In Calib | Blue | 9 |
| Zero Fail | *HRed | 8 |
| Mid Fail | *HRed | 8 |
| Span Fail | *HRed | 8 |
| Calib Fail | *HRed | 8 |
| Zero Cal | *HGreen | 9 |
| Mid Cal | Aqua | 9 |
| Span Cal | Fuschia | 9 |
| Multi Cal Bits Set | Fuschia | 9 |
| Old Data | Teal | 11 |
| Untouched | LtGray | 12 |
| OOC Part 75 | *HRed | 7 |
| OOC Part 60 | *HRed | 7 |
| Edited Data | *HWhite | 14 |
| Recovered | *HTeal | 13 |
| Out of Control | *HRed | 7 |
| Strangecal | *HWhite | 10 |

\* High Intensity

SYSTEMS, METHODS AND COMPUTER PROGRAM PRODUCTS FOR CONTINUOUS EMISSIONS MONITORING ON-LINE

BACKGROUND OF INVENTION

The present invention relates to continuous emissions monitoring, and more particularly, to systems, methods and computer program products for providing remote access to real-time emissions data.

The burning of fossil fuels by power generation plants leads to the production of pollutants such as nitrogen oxides ($NO_x$), sulfurous compounds (e.g., $SO_2$), carbon monoxide (CO), and carbon dioxide ($CO_2$) as by-products of the combustion process. In an effort to control the dissemination of these pollutants into the atmosphere, state and Federal governments have enacted laws and regulations restricting the amounts of the aforementioned substances that a power generation plant may emit into the atmosphere.

Since around 1993, continuous emissions monitoring (CEM) systems have been utilized in most fossil-fuel power generation systems to meet the reporting requirements set forth by the Environmental Protection Agency (EPA) and particularly, by 40 C.F.R. §§60 and 75. In 40 C.F.R. §75, all fossil-fuel systems are required to report emission data on a regular basis. For example, quarterly reports, also known as electronic data reports (EDR), must be submitted by all fossil-fuel generation systems, and these reports must include, for example, the monitoring plan information that identifies the source, power generating units, the emissions being monitored, analyzer manufacturer, and the sample acquisition methods. This information is gathered electronically from data collection devices, which are part of a data acquisition and handling system (DAHS) and one or more software applications process the raw data to generate the required reports.

Such CEM systems are widely used today for monitoring the operation of fossil-fuel power generating systems and to comply with the regulatory reporting requirements. However, such systems are generally implemented in a client server configuration where the server receives the data collected by a DAHS and processes that data, and delivers that data to the client application for presentation to the user. However, due to the vast number of systems in place for measuring and monitoring the operational characteristics of a power generation plant, numerous software applications are required to be bundled together at the server in order to provide the CEM functionality. This may require the client application to have multiple modules to be compatible with the different applications running on the server, making the client application relatively complicated.

In addition, a client server configuration has inherent limitations associated with upgrades to both the client and the server software and the compatibility of the various versions. For example, updating the server software may require updating the software of each and every client application before that client can interface at a desired level of functionality with the server. In addition, as the level of functionality grows, the client application may require additional processor and/or memory capabilities. For example, as the regulations and emission reporting requirements of the government continuously change on a year-to-year basis due to economic changes, industrial activity, technological improvements, and many other factors, the software will need to be updated, perhaps on every client and every server. This is a daunting task, especially given the timing requirements of the upgrades being done virtually simultaneously and the updated version are not backward compatible.

Another inherent limitation of the client server architecture is becoming more and more evident as utility companies expand into different geographic markets. As well known in the industry, many utility companies have combined to form multi-state or regional companies, some of which have operations on opposite sides of the country. Accordingly, with each power plant having a CEM system, some utility companies have a relatively large number of CEMs to monitor, each through a separate system, and often time there is no one location with access to all CEMs.

It also is desirable to monitor and manage the operations of multiple power plants located in geographically remote locations for a number of reasons. For example, monitoring emissions of all one's power plants enables one to more efficiently track and manage the exposure associated with emission credits, that is, sulfur dioxide ($SO_2$) credits. All the credits owned by the company can be more efficiently managed with a complete view of the data for all CEMs at once.

In addition, the remote monitoring of a power plant enables more efficient maintenance and repair operations. For example, viewing an alarm or episode, and perhaps even determining its cause before dispatching a service technician will expedite the resolution of the problem by avoiding the dispatch of a service technician with the wrong skill set. In addition, maintenance operations can be more efficiently managed, including the management of inventory parts used in maintenance and repair operations based upon the knowledge of active problems or conditions associated with the operation of the power plant.

Accordingly, an unsatisfied need exists in the industry for a CEM system that enables efficient monitoring of real-time emission data of a power plant from a remote location.

SUMMARY OF INVENTION

The present invention is directed generally to systems, methods and computer program products that provide secure access to emissions data from one or more power plants in real-time via a web-based interface. The user accessing the emissions data does not need specialized software on their computing device other than a commercially available Internet browser application. Accordingly, the user is not required to install new software with every upgrade or regulatory change. In addition, a system in accordance with the present invention is highly scalable with regard to users and power plants.

In accordance with an aspect of the present invention, a method for providing access to real-time emissions data over a distributed network comprises receiving real-time emissions data associated with a first power generating plant, receiving a request from a user to view at least one of the reports, wherein the request is sent from a web browser, generating a report based at least in part on the emissions data, sending the report to the user, wherein the report is viewable with a web browser, receiving a request from the user to view emissions data associated with a second power generating plant, determining if the user is authorized to view emissions data associated with the second power generating plant, and if the user is authorized, then providing the user with access to the emissions data associated with the second power generation plant.

In accordance with another aspect of the present invention, a system that provides access to real-time emissions data over a distributed network comprises a data collection device that receives real-time emissions data associated with a first power generating plant, a web-based data acquisition and handling system (DAHS) module that receives the emissions data from the data collection device and generates reports based at least in part on the emissions data, and at least one database that stores the emissions data and the reports, wherein the web-based DAHS module is configured to receive a request from the user to view at least one report associated with the first power generating plant, and in response generates a web interface including the requested report and sends the web interface to the user for viewing with a browser application.

The web-based DAHS module may be configured to receive a request from the user to view emissions data associated with a second power generating plant, and in response determines if the user is authorized to view the emissions data associated with the second power generating plant, and if the user is authorized then providing the user with access to the emissions data associated with the second power generation plant

BRIEF DESCRIPTION OF DRAWINGS

Figure 1:
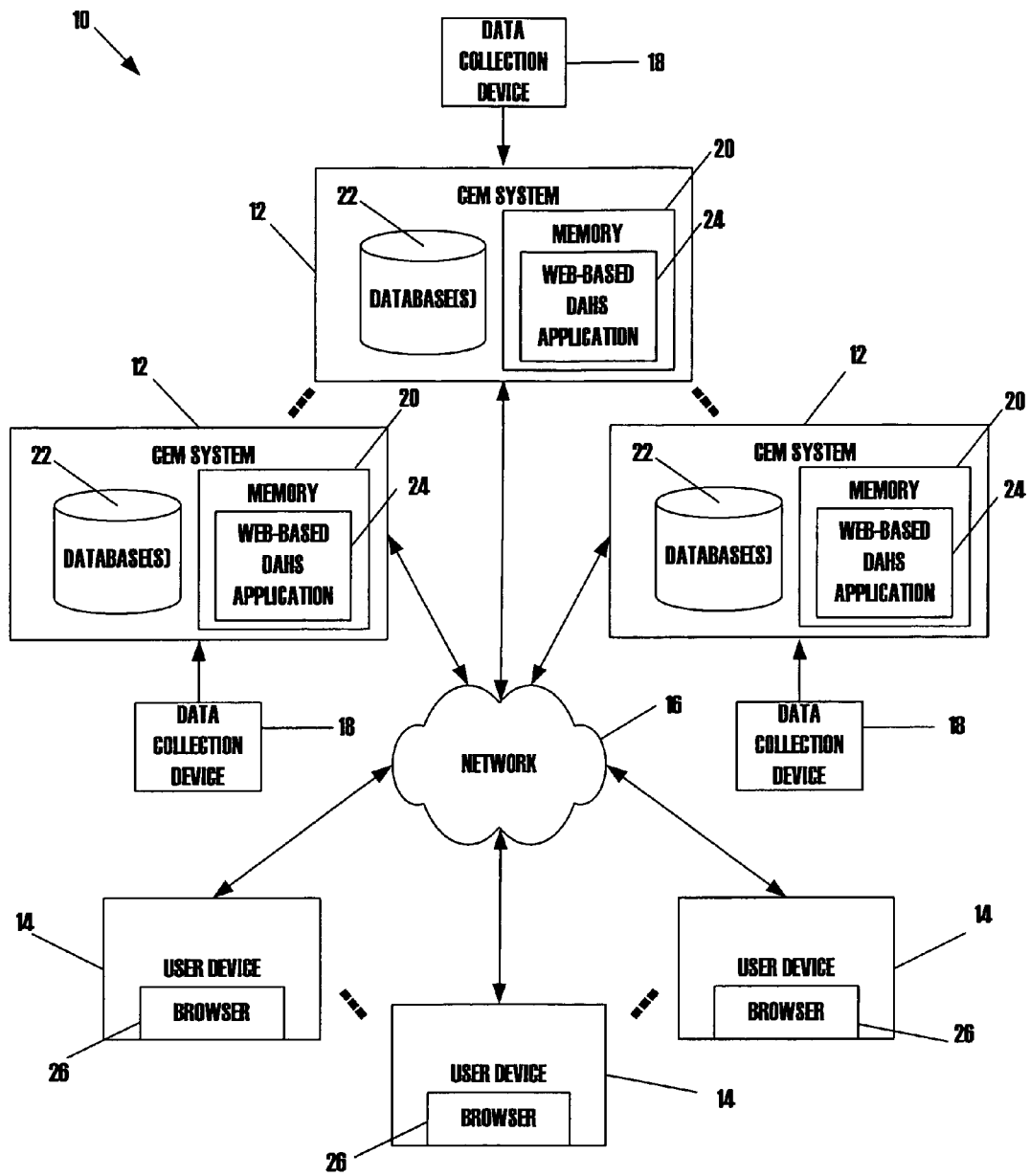

Having thus described the invention in general terms, reference will now be made to the accompanying drawings, which are not necessarily drawn to scale, and wherein:

FIG. 1 is a schematic block diagram illustrating a continuous emissions monitoring system in accordance with an embodiment of the present invention.

Figure 2:
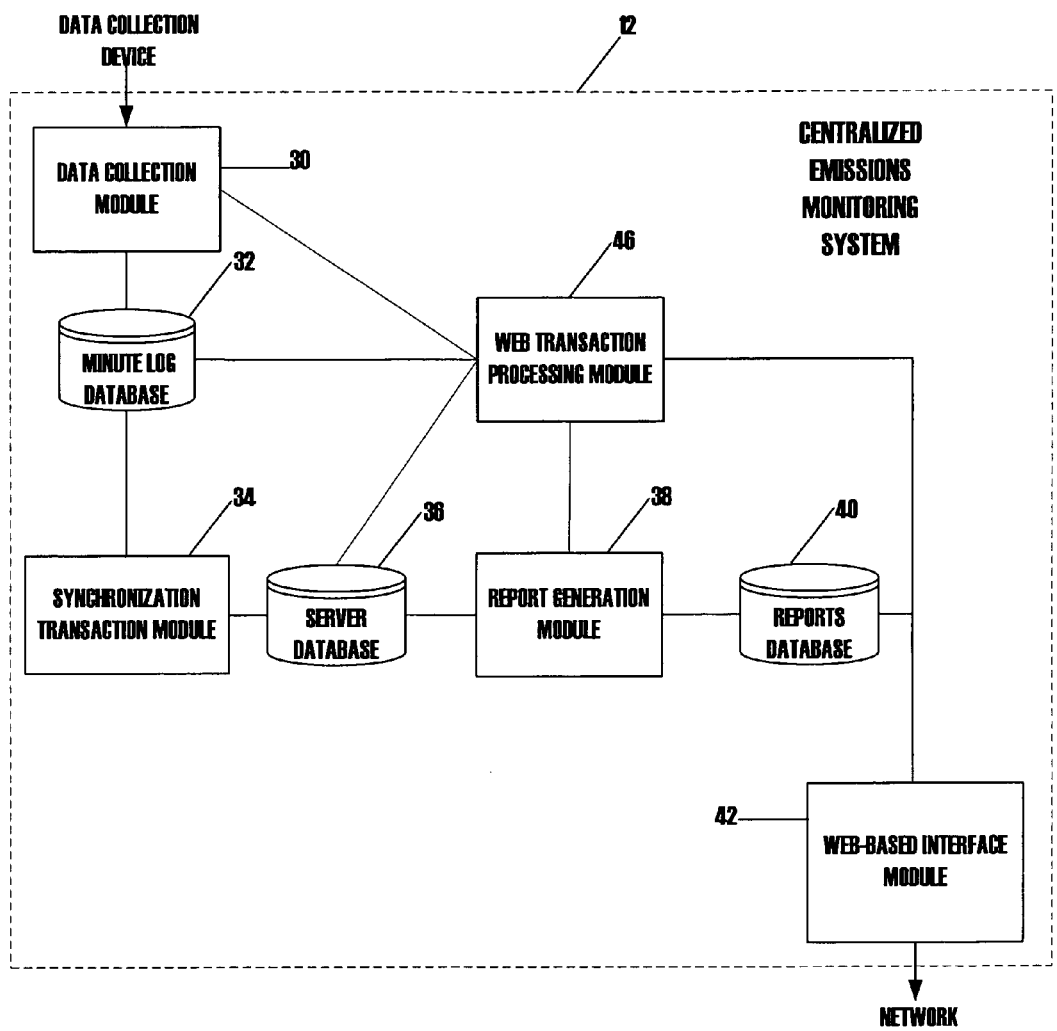

FIG. 2 is a schematic block diagram generally illustrating the data flow of a continuous emissions monitoring system in accordance with the present invention.

Figure 3:
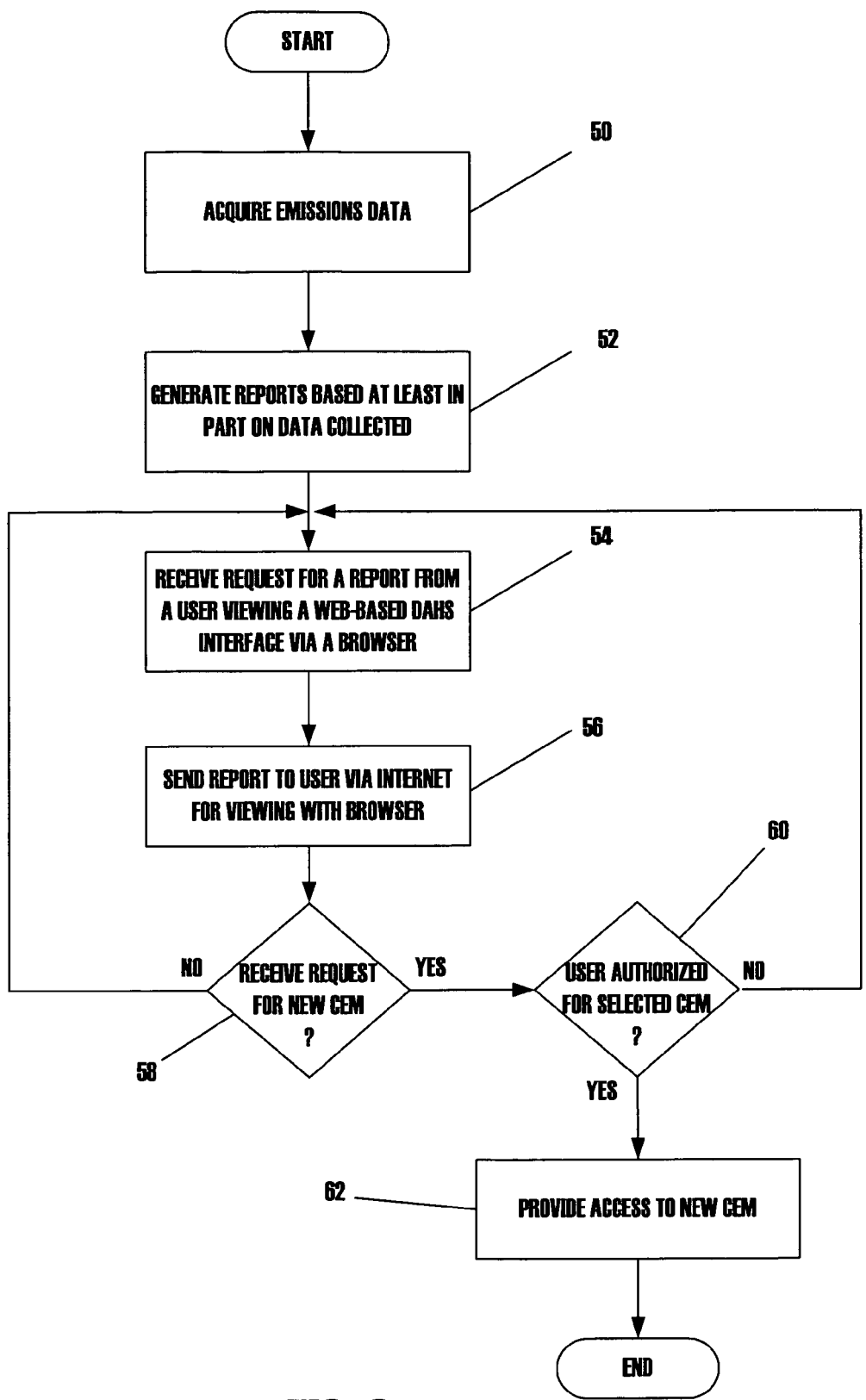

FIG. 3 is a flow diagram of the operation of a continuous emissions monitoring system in accordance with an embodiment of the present invention.

Figure 4:
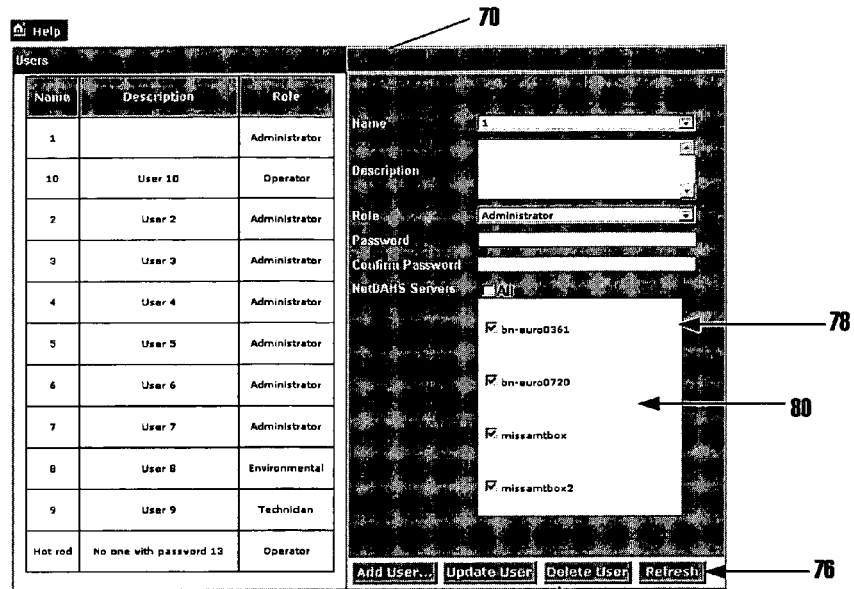

FIG. 4 is a graphical user interface for providing security administration of the user accounts.

Figure 5:
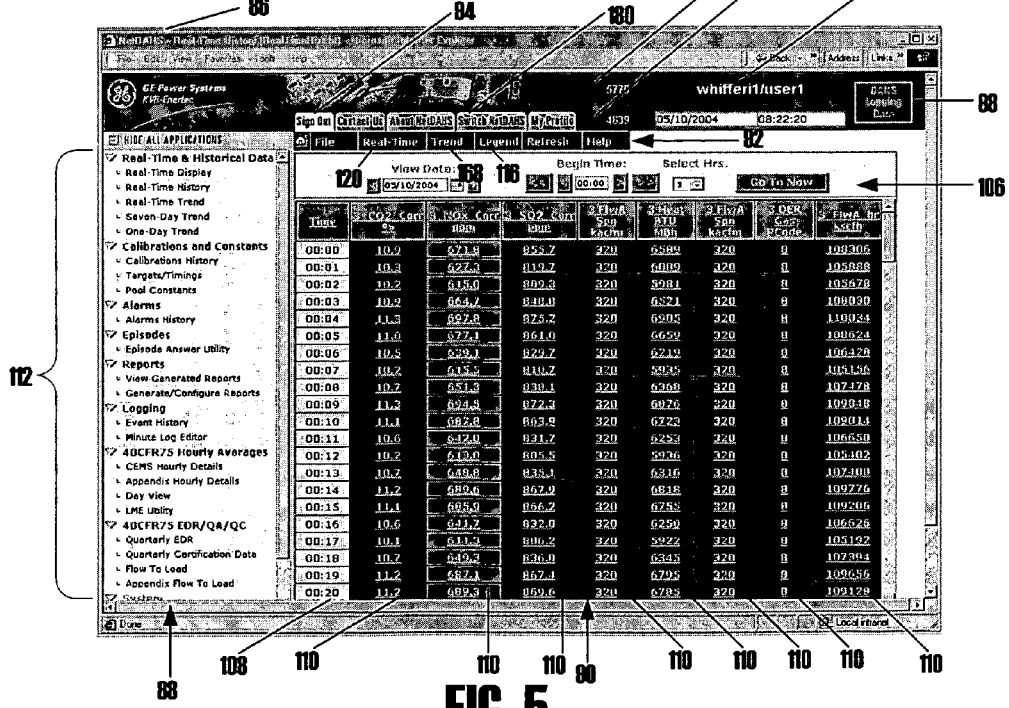

FIG. 5 is a graphical user interface for providing real-time historical data in accordance with an embodiment of the present invention.

FIG. 6 is a graphical user interface for an illustrative legend for use with the user interfaces of the illustrative embodiment.

Figure 7:
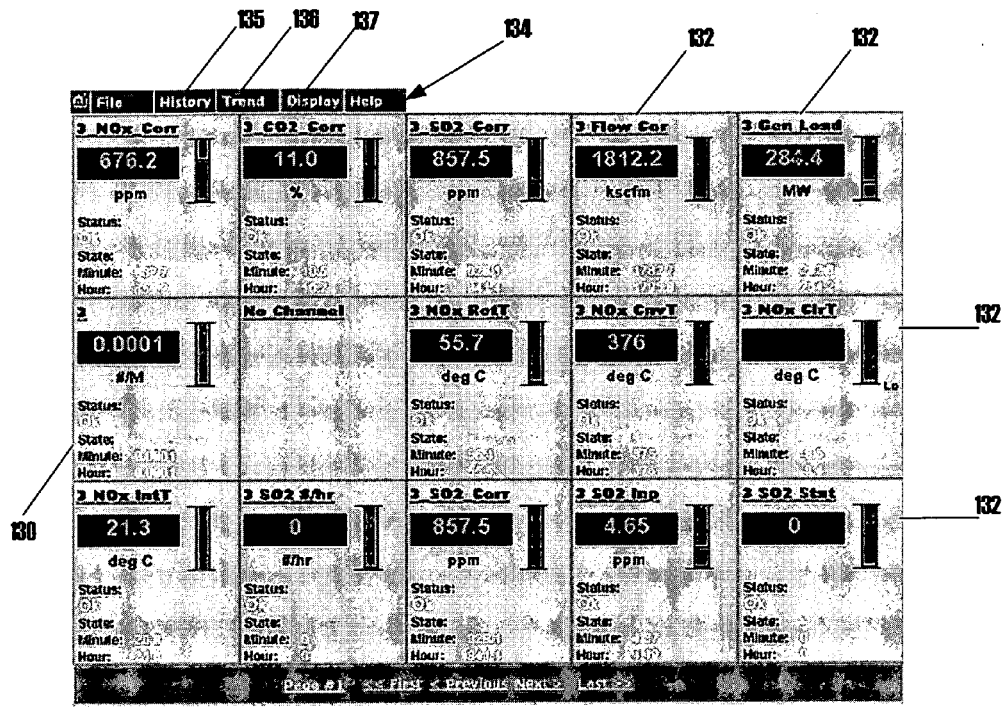

FIG. 7 is a graphical user interface for providing real-time data in accordance with an embodiment of the present invention.

Figure 8:
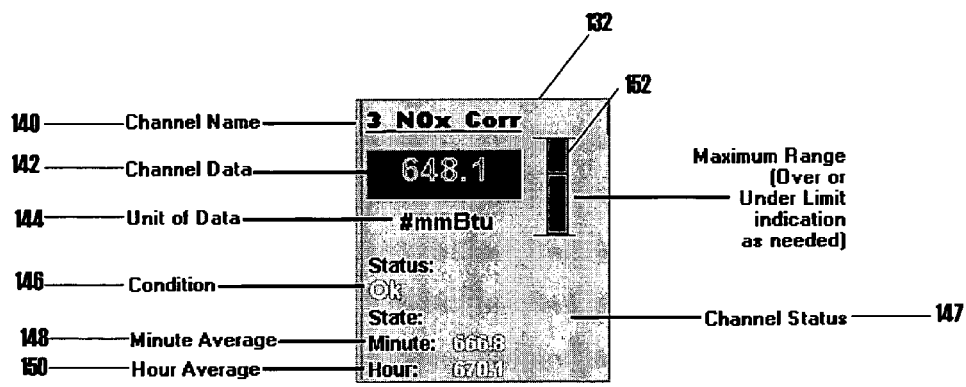

FIG. 8 is a graphical user interface of a channel box for displaying information pertaining to a particular channel in accordance with an embodiment of the present invention.

Figure 9:
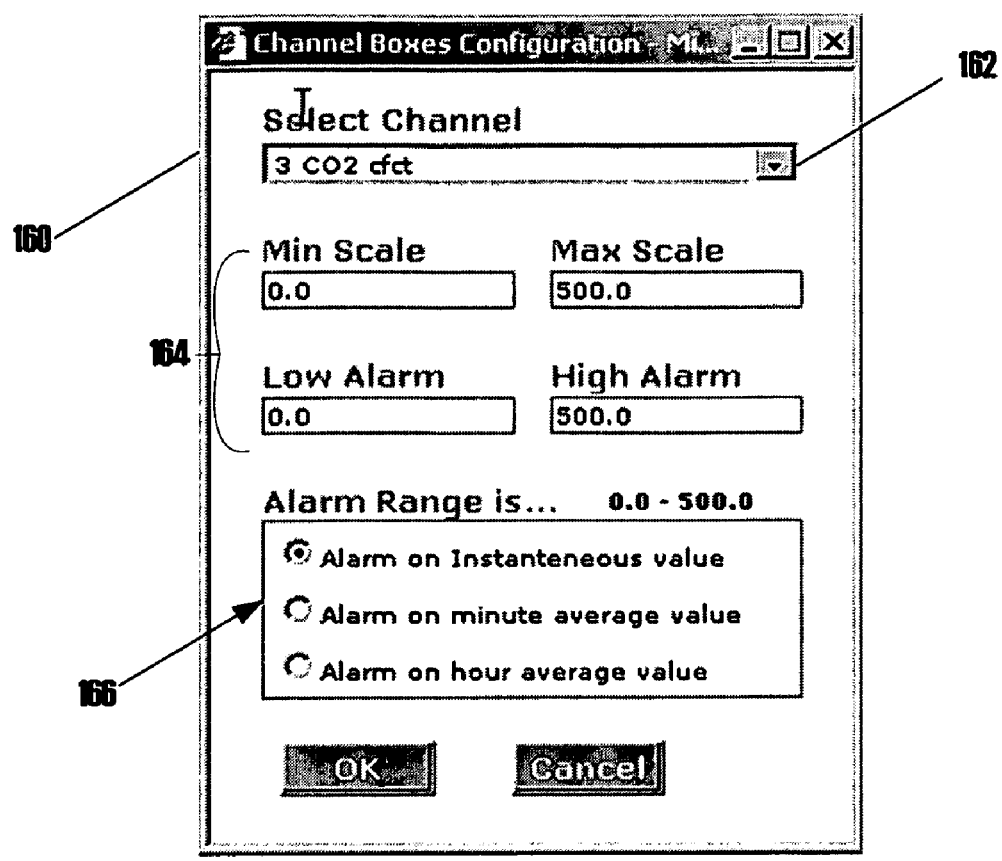

FIG. 9 is a graphical user interface for configuring a channel box, such as that of FIG. 7, in accordance with an embodiment of the present invention.

Figure 10:
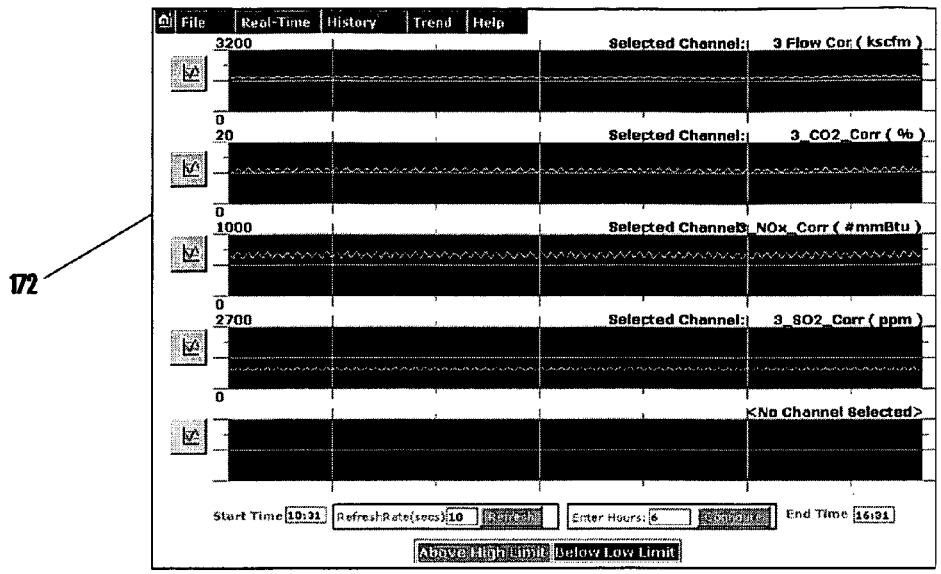
Figure 11:
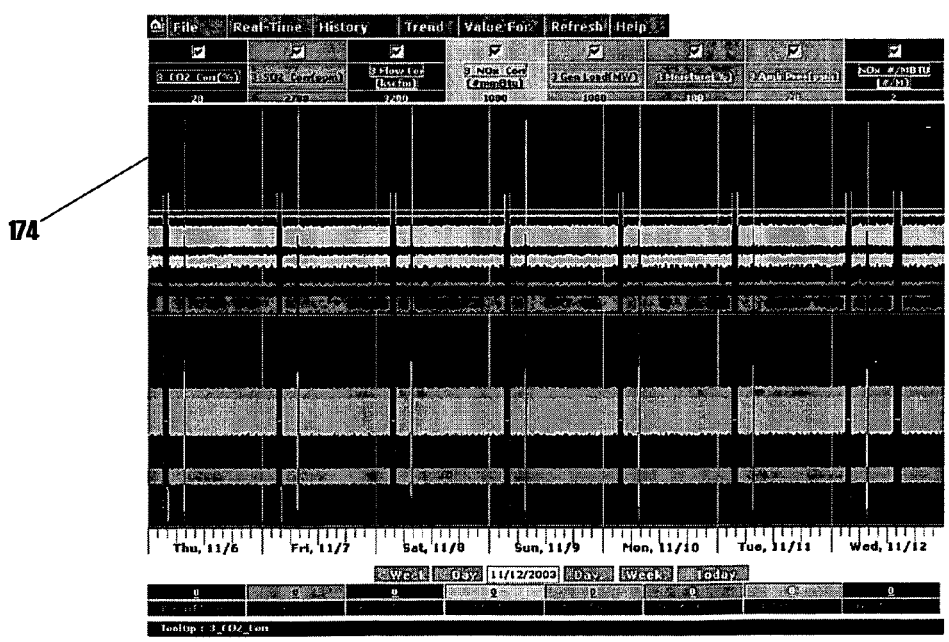

FIGS. 10–11 are graphical user interfaces for providing trend data in accordance with an embodiment of the present invention.

Figure 12:
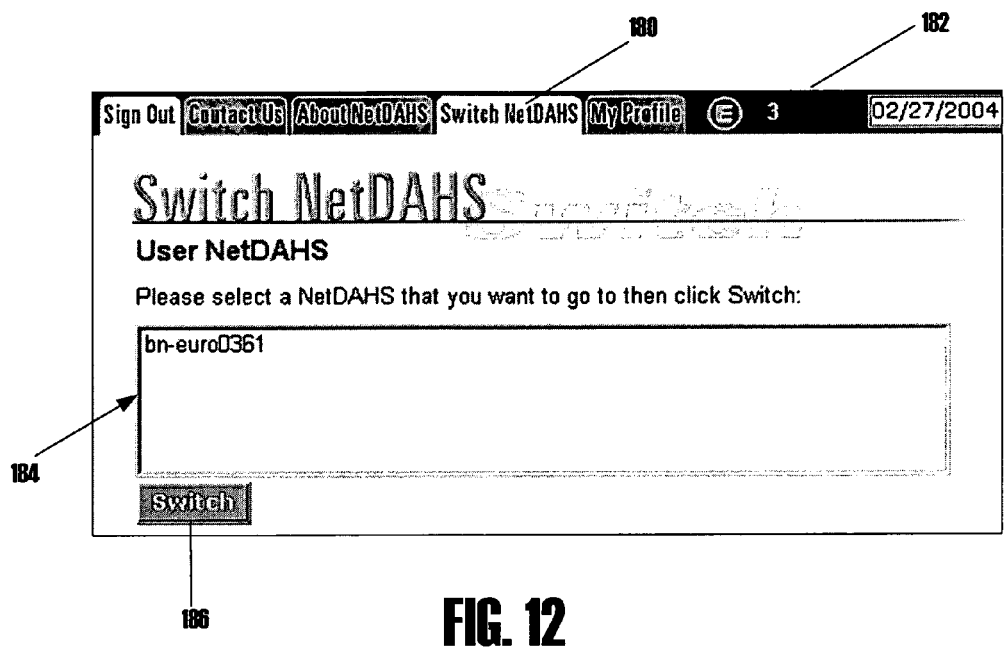

FIG. 12 is a graphical user interface for switching to a different CEM server in accordance with an embodiment of the present invention.

Figures 13, 14:
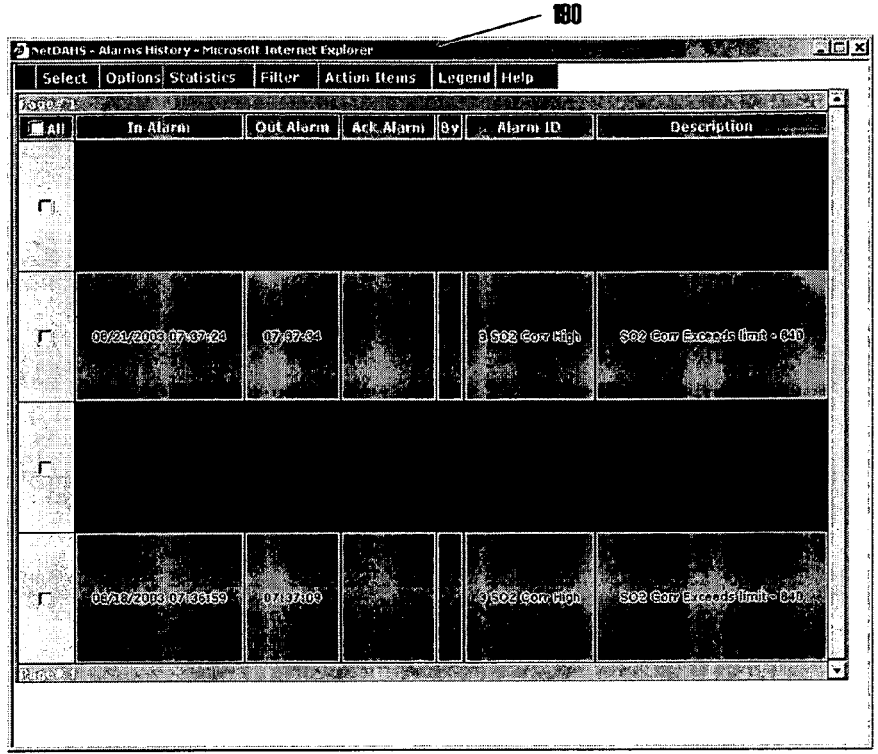

FIG. 13 is a graphical user interface for providing alarm history data in accordance with an embodiment of the present invention.

Figures 15, 16:
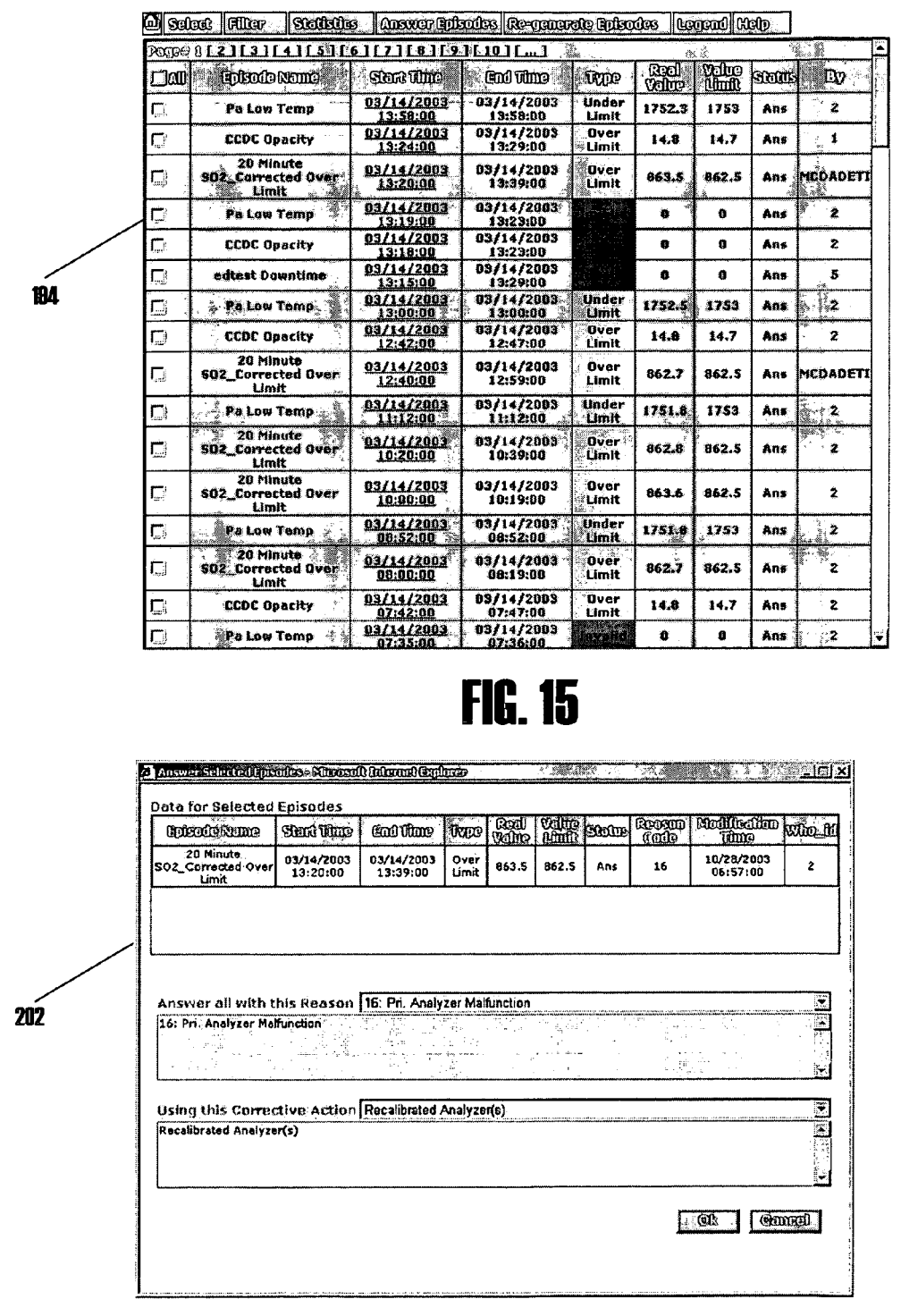

FIGS. 14 and 15 are graphical user interfaces for providing episode information in accordance with an embodiment of the present invention.

FIG. 16 is a graphical user interface for answering an episode in accordance with an embodiment of the present invention.

Figure 17:
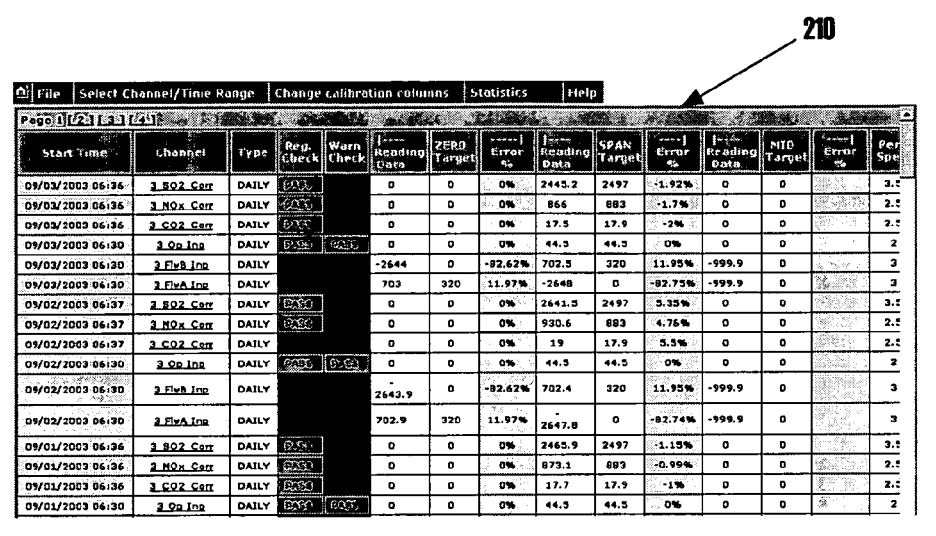

FIG. 17 is a graphical user interface for providing historical calibration data in accordance with an embodiment of the present invention.

Figure 18:
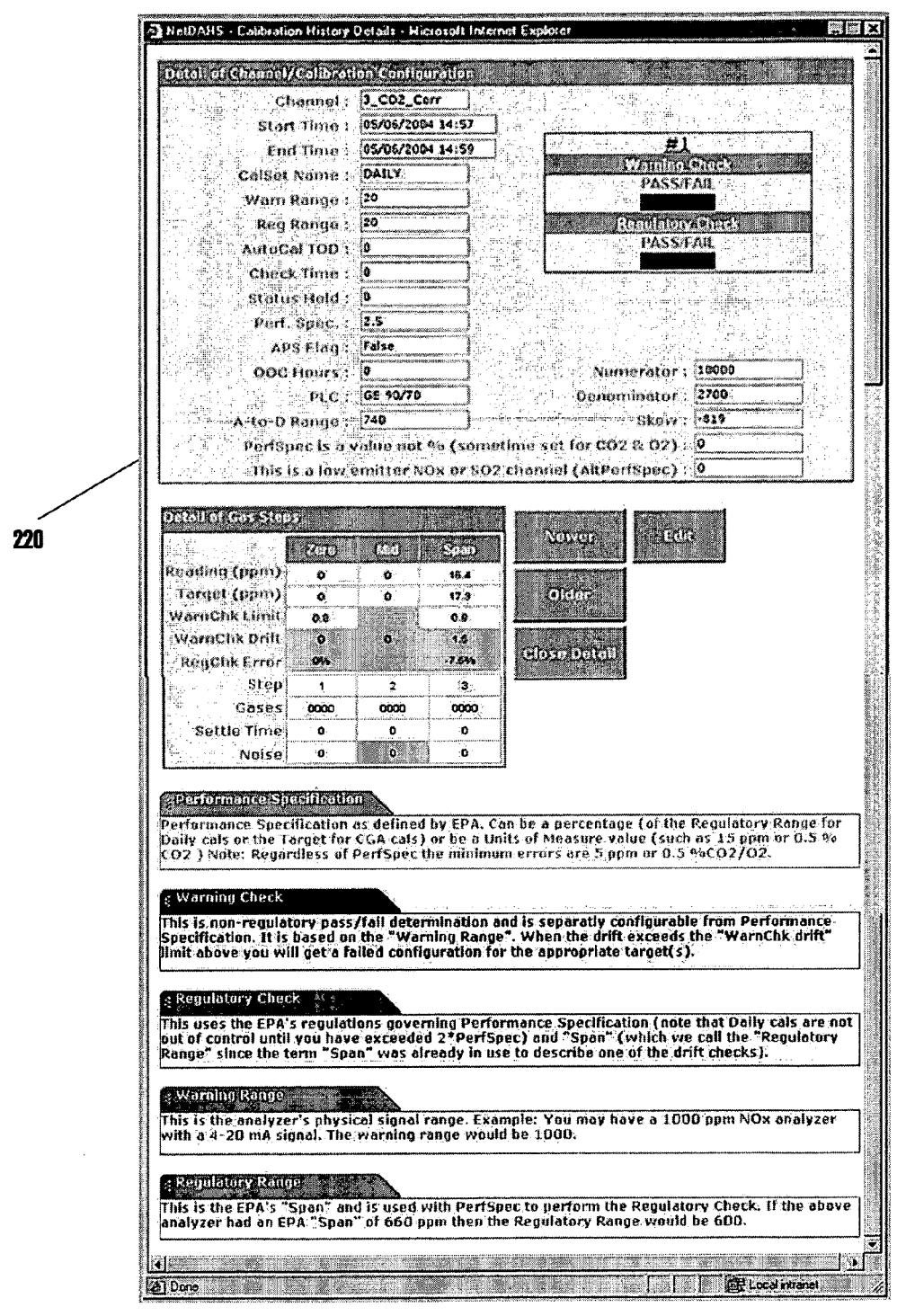

FIG. 18 is a graphical user interface for providing detailed calibration information for a selected channel in accordance with an embodiment of the present invention.

Figure 19:
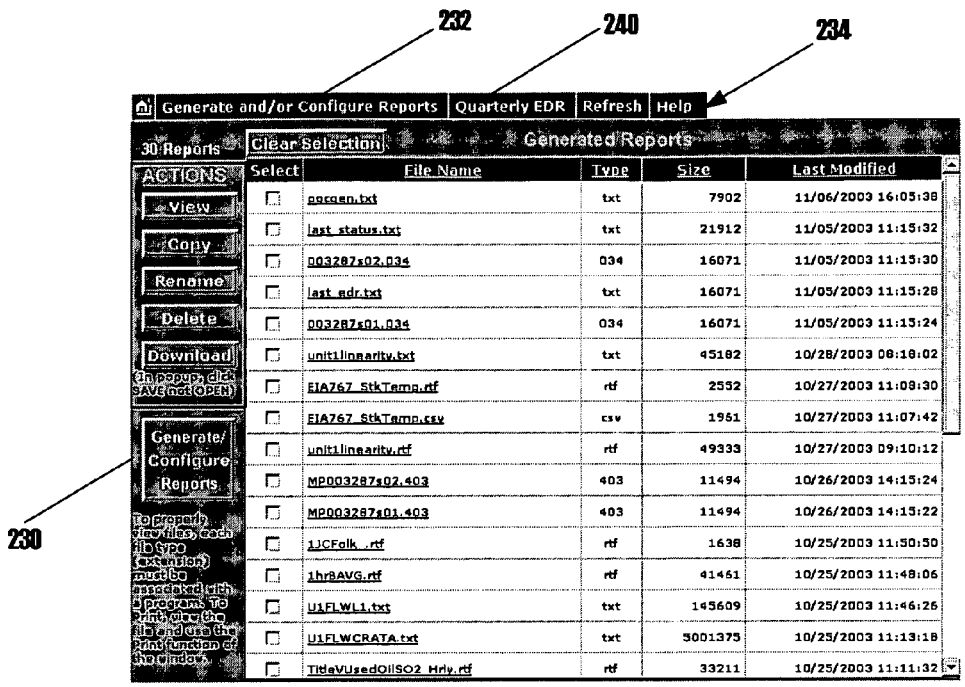

FIG. 19 is a graphical user interface for providing configured reports in accordance with an embodiment of the present invention.

Figure 20:
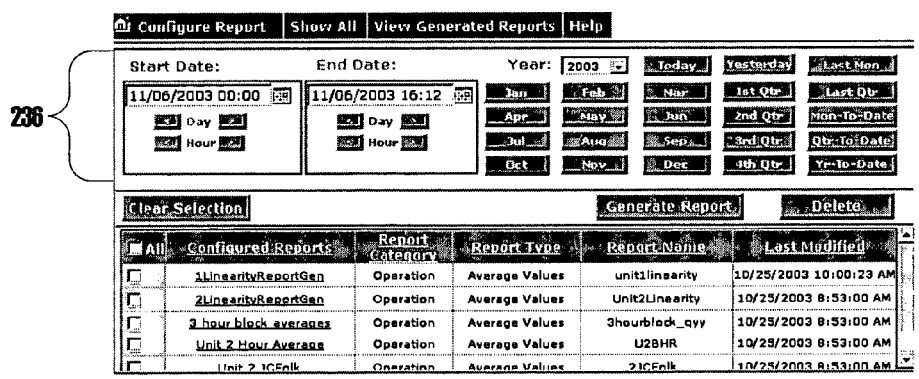

FIG. 20 is a graphical user interface for configuring reports in accordance with an embodiment of the present invention.

Figure 21:
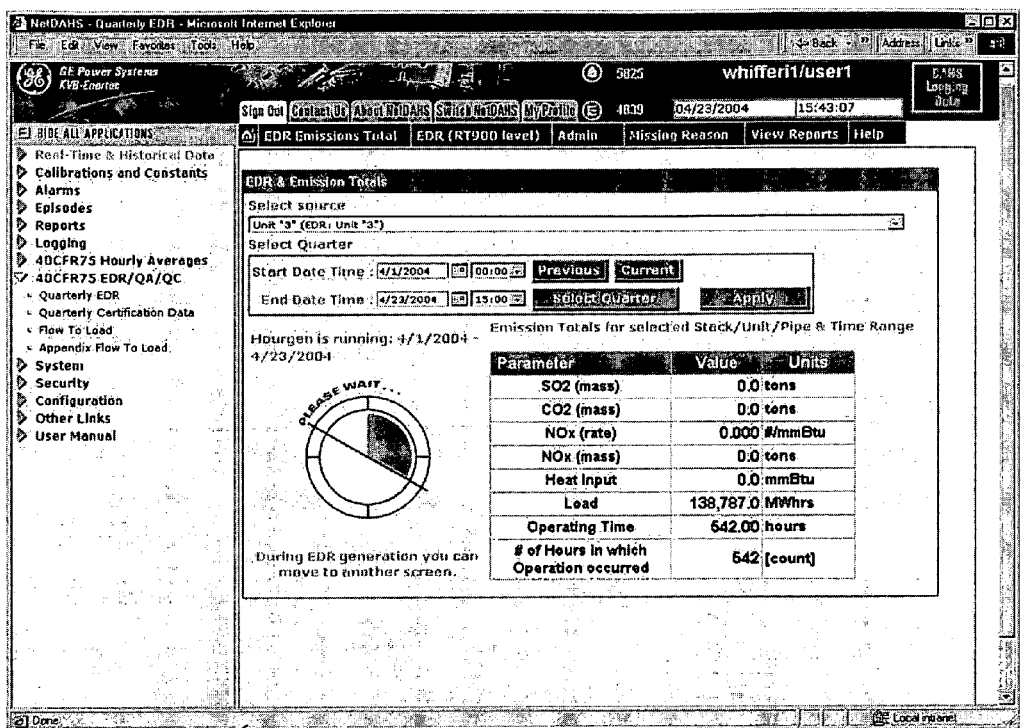

FIG. 21 is a graphical user interface for providing quarterly EDR reports in accordance with an embodiment of the present invention.

Figure 22:
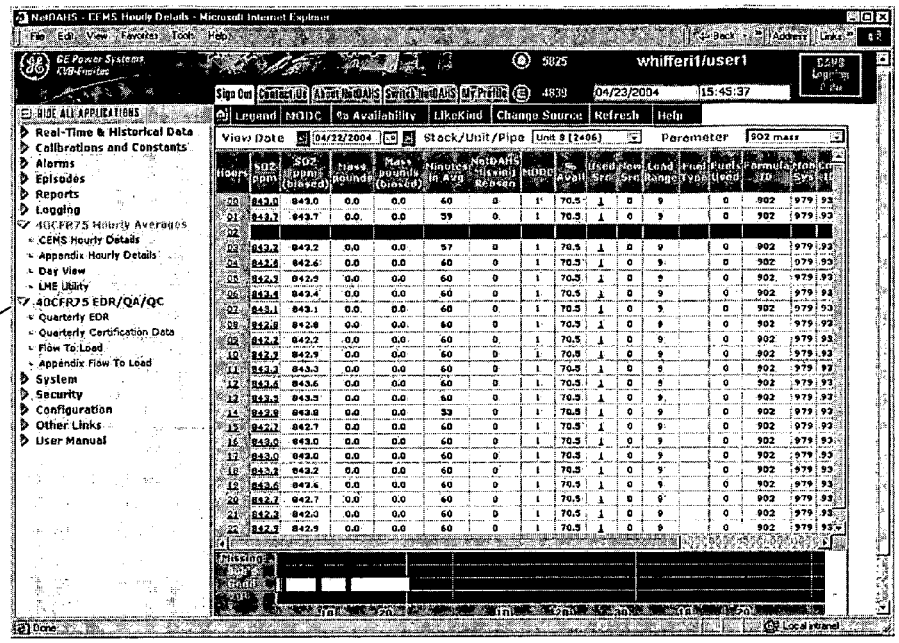
Figure 23:
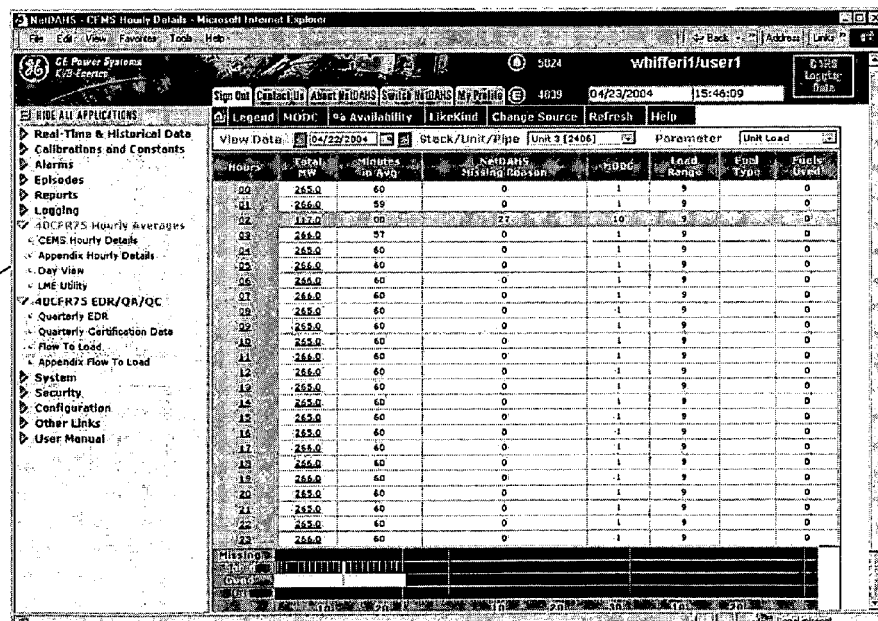

FIGS. 22–23 are graphical user interfaces for providing hourly averages reports in accordance with an embodiment of the present invention.

DETAILED DESCRIPTION

The present invention will now be described more fully hereinafter with reference to the accompanying drawings, in which preferred embodiments of the invention are shown. This invention may, however, be embodied in many different forms and should not be construed as limiting to the embodiments set forth herein; rather, these embodiments are provided so that this disclosure will be thorough and complete, and will fully convey the scope of the invention to those skilled in the art. Like numbers refer to like elements throughout.

The present invention is described below with reference to block diagrams and flow chart illustrations of methods, apparatuses (i.e., systems) and computer program products according to an illustrative embodiment of the invention. It will be understood that each block of the block diagrams and flow chart illustrations, and accommodations of blocks in the block diagrams and flow chart illustrations, respectively, can be implemented by computer program instructions. These computer program instructions may be loaded onto one or more general purpose computers, special purpose computers, or programmable data processing apparatus to produce machines, such that the instructions which execute on the computers or other programmable data processing apparatus create means for implementing the functions specified in the flow chart block or blocks. Such computer program instructions may also be stored in a computer-readable memory that can direct a computer or other programmable data processing apparatus to function in a particular manner, such that the instructions stored in the computer-readable memory produce an article of manufacture including instruction means that implement the function specified in the flow chart block or blocks.

FIG. 1 shows a block diagram illustrating components comprising a continuous emissions monitoring (CEM) system 10 in accordance with an embodiment of the present invention. As illustrated in FIG. 1, the system 10 includes one or more CEM systems 12 and one or more user devices 14 located at one or more sites. The CEM systems communicate with the user devices 14 via a network 16, which may be a wide area network (WAN), such as the internet, a local area network (LAN), or another high-speed network as known by those skilled in the art. According to the preferred embodiment of the present invention, the CEM systems 12 and user devices 14 are in communication with one another using TCP/IP and Ethernet connections via one or more high speed links, such as T-1 lines. Alternative methods of communication may also be used, such as conventional modems using POTS.

For purposes of the illustrative embodiment, each CEM system 12 is associated with a power generation plant, such as a fossil-fuel generation plant for which the CEM system 12 monitors the emissions. A data collection device 18, such as a programmable logic controller (PLC) device or data logger, is associated with each CEM system 12 for receiving the emissions and other data from the power generation plant and delivering that data to the associated CEM system 12. Accordingly, it is expected that each CEM system 12 is geographically remote with respect to the other CEM systems 12, as is typically the case because each power generation plant is designed to provide power to a particular geographic service area.

Each CEM system 12 includes a memory 20 and database 22. The memory 20 includes a web-based data acquisition and handling system (DAHS) application 24 that generates the graphical user interfaces, which are described in detail below, to display emissions reports and other emissions data generated at least in part from the real-time emissions data received from the associated data collection device 18. The graphical user interfaces generated by the DAHS application 24 can be delivered to one or more of the user devices 14 for viewing, such as with a browser application 26. Because the reports and data generated by the DAHS application 24 are deliverable to the user devices 14 over the network 16, the user can access the reports and data from multiple remote CEMS 12.

The user device 14 may be any data processing device with communication means suitable for interfacing with a network 16. In addition, the communication between the user devices 14 and network 16 may be wire, wireless, or a combination thereof. The user devices 14 may be personal computers, thin-client computers, PDAs, laptops, tablet computers, or any other suitable computing device. In the illustrative embodiment, the browser application 26 is a Microsoft Internet Explorer browser version 5.5 or greater.

The emissions data received from a data collection device 18 is stored on a database 22. It will be appreciated that the databases 22 may include random access memory, read-memory, hard disk drive, a floppy disk drive, a CD-ROM, or optical disk drive, for storing information on the various computer-readable media, such as a hard disk, removable magnetic disk, or a CD-ROM disk. In general, the purpose of the database 22 is to provide non-volatile storage of the emissions data received from the data collection devices 18 and the reports generated based upon that data and other information.

It also will be appreciated that the memory 20 in which the web-based DAHS application reside may comprise random access memory, read-only memory, a hard disk drive, a floppy disk drive, a CD-ROM drive, or optical disk drive, for storing information on the various computer-readable media such as a hard disk, removable magnetic disk, or a CD-ROM disk. Generally, the web-based DAHS application 24 receives information from a data collection device 18 that includes emission data, analytical data, plant load (megawatts), fuel flow, and other plant data and status information. To utilize this information, the web-based DAHS application 24 generates graphical user interfaces to provide the data and reports to the user, which is described in greater detail with reference to FIGS. 4–23, thereby enabling a user to monitor the real-time emissions of a remote power generation plant associated with a CEM system 12.

It is important to note that the computer-readable media described above with respect to data memory 20 and database 22 could be replaced by any type of computer-readable media known in the art. Such media includes, for example, magnetic cassettes, flash memory cards, digital video disk, and Bernoulli cartridges. It will be also appreciated by one skilled in the art that one or more of the CEM system 12 components may be located geographically remote from the other components of the corresponding CEM system 12. For example, one or more components of the database 22 may be located remotely with respect to the corresponding CEM system 12. In addition, databases 22 may comprise multiple databases operating remotely with respect to one another under the control of a single or multiple database applications.

The functional operation of the CEM system 12 may now be further described in the context of the illustrated embodiment provided in the flow diagrams of FIGS. 2–3 and user interfaces of FIGS. 4–23. With reference to FIG. 2, illustrated as a data flow diagram providing illustrative example of the operation of a CEM system 12 in accordance with the present invention. The databases illustrated and described are those which comprise database 22 and the functional software modules illustrated and described are those which comprise the web-based DAHS application 24 of FIG. 1. However, it should be noted that a CEM system 12 may comprise other functional components not illustrated in FIG. 2 for purposes of implementing a continuous emissions monitoring system.

Initially, the data collection device 18 delivers real-time emission data to a data collection module 30 which processes the data and generates one-minute logs of the collected data. The one-minute logs comprise the emissions data variable and process data variables taken from the associated power generation plant. The one-minute logs are stored in the minute log database 32. The one-minute log data is also forwarded to a synchronization transaction module 34 that creates one hour averages of data, which is stored in a server database 36. It is well known in the industry that the one hour average data is calculated according to the requirements of 40 CFR §75. The data stored in the server database 36 includes calibration data, one hour records, alarms, episodes, and system configuration data (e.g., type of plant, type of analyzer, etc.).

A report generation module 38 accesses the data on server database 36 and generates reports, typically for reporting to the state and Federal government agencies, which are stored in the report database 40. A web-based interface module 42 retrieves the reports from the reports database 40 and generates web page interfaces for delivery to a browser application 26 operating on the user device 14. Information not contained in the reports database is accessed by the web-based interface module 42 via a web transaction processing module 46.

A web transaction processing module 46 gathers data from the server database 36 and the minute log database 32 and presents that data to the web-based user interface module 42 in a format suitable for generation of the graphical user interfaces. In one preferred embodiment, the web transaction processing module 46 utilizes object-based programming in order to separate the data collection function from the presentation function in order to facilitate the dynamic generation of graphical user interfaces for presentation of the data. The web transaction processing module 46 is often called middle ware while the web based interface module is the dynamically generates the graphical user interface.

FIG. 3 shows a flow diagram illustrating a process implemented by the CEM system 12 of FIG. 1, according to one embodiment of the present invention. The process begins at step 50 with the acquisition of real-time emissions data, typically with a PLC or data logger. Next, at step 52, reports are generated based at least in part on the collected emissions data. These reports, as mentioned above, are typically generated for submission to state and/or federal authorities in accordance with regulations governing the emissions of certain compounds into the atmosphere.

A request is received from a user to review a report using a web-based interface such as a browser, as indicated by step 54. A report is sent to the user via the Internet for viewing with a browser, as indicated by step 56. At step 58, it is determined whether the user wishes to view emissions data associated with a different CEM. If not, then the process awaits another request for a report from the user. If the user does request to view emission data from another CEM, then a security check is performed to determine whether the user is authorized to have access to the selected CEM, as indicated by step 60. If the user does not have authorization to view the selected CEM, the system awaits another request for other data at the current CEM. If the user does have access to the selected CEM, then the user is provided access to that CEM, such as by linking the user to the new CEM, as indicated by step 62. With the new CEM the user may be required to provide login information, or alternatively, the user's login information may be embedded within the link and passed to the new CEM in a manner transparent to the user. It should be noted that the request to view a new CEM at step 58 may occur at virtually any point within the process of FIG. 3 and is provided for after step 56 for illustrative purposes.

According to one aspect of the present invention, the DAHS application 24 may comprise software products for generating graphical user interfaces. Therefore, it will be understood that each of the accompanying graphical user interfaces may be implemented by computer program instructions. These computer program instructions may be loaded into a general purpose computer, special purpose computer or other programmable data processing apparatus to produce a machine, such that the instructions which execute in the computer or other programmable data processing apparatus create means for implementing the functions illustrated by and described with reference to the illustrative user interfaces provided herein.

The computer programmable instructions may also be stored in a computer readable memory that can direct a computer or other programmable data processing apparatus to function in a particular manner, such that the instructions stored in the computer-readable memory produce an article of manufacture including instruction means that implement the functions illustrated by the interfaces. The computer program instructions may also be loaded onto a computer or other programmable data processing apparatus to cause a series of operational steps to be performed on the computer or other programmable apparatus to produce a computer implemented process such that the instructions that execute on the computer programmable apparatus provide steps for implementing the functions described herein.

FIGS. 4–23 illustrate some of the graphical user interfaces provided by the DAHS application 24 of the present invention for the remote monitoring of real-time emissions data from a plurality of CEM systems 12. It will be appreciate that the graphical user interfaces are viewed by the users at a user device 14 via a browser 26. The interfaces may be web-based such that the users can access the interfaces via the Internet, at any time, from any location where there is a suitable browser application operating on a user device. It will be appreciated with reference to the interfaces that some of the functions described herein are only available to some users accessing the interfaces, typically based on user login information.

With reference to FIG. 4, illustrated is an administrative user interface 70 for managing the secure access to the CEM system 12. The user interface 70 comprises two windows, a user list window 72 and a user administration window 74. The user list window 72 comprises a list of users by name, description, and role. Of particular interest, each role defines the applications, that is, the capabilities, to which the user will have access, as discussed in greater detail below. The user administration window 74 comprises a menu bar 76 and profile data portion 78. The profile data portion shown in FIG. 4 is that which is used to add a new user or to update a user profile. As shown, the new user will be identified by a name, description, role, and the CEM systems 12 to which the user will have access. In particular, the CEM systems 12 that the user will have access to are identified by the selectable boxes 80. In the illustrative embodiment, the CEM systems 12 are identified as NetDAHS servers, wherein each one is associated with a separate power generation plant. As evidenced by the selectable buttons and menu bar 76, the user profile can be updated, the user can be deleted, and the screen may be refreshed.

The server database 36 includes emissions data, configuration data, calibration data and security data. The security data base is used by the web based DAHS application 24 to validate each user click and user page load, thus providing for a very robust security system. Finally the security data base can be replicated between each database 22 on different CEM systems 12 across the network 16. This allows the system administrator to add, update or delete a new user to any CEM system and that new users authentication privileges are replicated to all CEM systems 12 at all locations attached to the network 16.

FIG. 5 shows a main application interface 86 presented to the user once the user has logged in to a CEM system 12. The log-in process, as is well known, may comprise a user launching a browser application 26 on a user device 14 and then proceeding to a particular IP address associated with a CEM system 12 to which they have access rights, where the user will be presented with a log-in page. The user will be prompted to input a user name and password in order to gain access to the secure CEM system, as well known to those skilled in the art. Once the user has entered an acceptable user name and password, the user is presented with the main application interface 86. The main user interface comprises two main windows, a navigation window 88 and a data window 90. Above the data window 90 the interface provides a menu bar 92 and global tabs 94, both of which will be discussed in greater detail below. In addition, the name 96 of the CEM system is provided, as well as a status indicator 98 that indicates whether the emission data is being logged or not. An alarm indicator 102 and an episode indicator 104 are provided to indicate alarm and episode status. Adjacent to the alarm indicator 102 and episode indicator 104 are numerical indications of the number of alarms and episodes that have not been acknowledged or are unanswered, respectively.

For illustrative purposes, the main application interface 86 of FIG. 5 is displaying real-time history data in the data window 90. The real-time historical data displayed in the data window 90 is one minute average data calculated by the data collection module. The particular emissions data shown is defined by the date, time and duration selections made in the data selection bar 106. The emission data satisfying the options selected with the data selection bar 106 is presented in the data window 90 according to increments of time as identified by column 108. The emissions data is presented according to channel names in the respective columns 110. As well known in the industry, a channel is a stream of data associated with a particular measurement taken by an analyzer and/or sensor. At the top of each column 110 is the identification of the channel. By selecting (e.g., clicking on the text) the channel name, the user is given the option of changing the channel presented in that particular column.

In the main application interface 86, the navigation window 88 provides access to various functional applications of the CEM system 12. For example, each of the applications listed in navigation window 88 can be selected to reveal a listing of selectable options, as illustrated for several of the functional application 112. For example, real-time history data as presented in the data window 90 is viewable by selecting the Real-Time History option 114 under the real-time and then history data application 112. The function applications presented to the user in the navigation window 88 are defined by the role selected for that user in the user interface 70 of FIG. 4. For example, an administrator is provided different functional applications in the navigation window 88 than a technician or operator.

The menu bar 92 provides the user with certain options, including the option to view color code legend for the presented data. By selecting the Legend button 116, the user is presented with the legend window 118 of FIG. 6. While not illustrated in color, it will be appreciated that the user interfaces of the present invention may utilize color coding of the data and events to convey certain information. For example, as illustrated in legend window 118, the color of the text defines the state value and priority of that value or parameter presented via a user interface. As another example, the user can select the Real-Time button 120 to display real-time data in the data window 90. FIG. 7 provides an illustrative example of real-time data 130 for display in the data window 90. This same data will be presented if the user selects the Real-Time Display option 120 under the Real-Time & Historical Data application in the navigation window 88.

The real-time data 130 is presented in an array of real-time channel boxes 132. A menu bar 134 provides the user the option to switch to a display of real-time history data by selecting the History button 135, see trend graphs by selecting the Trend button 136, and change the number of boxes 132 on the screen by selecting the Display button 137. The real-time data presented for each channel is incoming emissions data, including instrument readings and status, as well as minute averages and hourly averages for each channel. This data is processed by the DAHS messaging module 44 of FIG. 2.

FIG. 8 shows an individual channel box 132 associated with a single channel. The illustrated channel box 132 includes the channel name 140, the instantaneous channel value 142, the unit of data 144, and the status 146 of the channel and the system state 147. In addition, a running minute average 148 and a running hour average 150 are also provided. A bar graph 152 provides the graphical view of the current value in relationship to the upper and lower limits of the channel range. The user can select, or click, the channel name to view information pertaining to the configuration of the presented channel, as illustrated in FIG. 9.

In FIG. 9, a channel box configuration interface 160 identifies the present channel in the select channel pull-down menu 162. To switch from one channel to another channel for presentation as a new channel box in the array of channel boxes 130, the user can select from among the channels listed in the pull-down menu 162. For the channel identified in the pull-down menu 162, certain information is provided such as the alarm limits 164 and the alarm triggers 166 (e.g., on the instantaneous value, on the minute average value, or on the hour average value).

The user may view trend data by selecting the Trend button 136 of menu bar 134 in FIG. 7, the Trend button 168 of the menu bar 92 of FIG. 5 or by selecting a trend option under the Real-Time & Historical Data application 112 in the navigation window 88 of FIG. 5. In either case, the user is provided with the option of viewing real-time trend, one-day trend, or seven-day trend in the illustrative embodiment. For example, FIG. 10 provides an illustrative real-time trend data 172 for presentation in the data window 90 of FIG. 5. The real-time trend data presents real-time trend graphs for respective channels. Similarly, FIG. 11 provides seven-day trend data for presentation in the data window 90 of FIG. 5.

With reference back to the main application interface 86 of FIG. 5, the global tabs 94 provide the user certain functionality. For example, the user can sign out (i.e., log off), contact the administrator, learn about the web-based DAHS application (collectively referred to as NetDAHS), switch to another CEM system, or view their user profile. With regard to the Switch NetDAHS tab 180, upon selecting that tab the user is presented with the user interface 182 of FIG. 12. This interface provides the user with a list of CEM systems 12 that they have authorization to access. The user can select the desired CEM system identified in window 184 and then select the Switch button 186 to be linked to the new CEM system where the user will interface with the CEM system. As discussed above, each CEM system is also referred to herein as a NetDAHS.

With reference again back to FIG. 5, the user may view the alarms by selecting the alarm indicator 102 of main application interface 86. The user is then presented with the alarms history interface 190 of FIG. 13 presented within the data window 90. The alarms history interface 190 provides a listing of all outstanding alarms, including those that have been acknowledged and those that have not. The alarm information includes the in alarm time, the out alarm time, whether the alarm has been acknowledged, and by whom, the alarm ID, and a description.

The user may view episodes by selecting the episode indicator 104 of the main application interface 86. The user is then presented the episode interface 192 of FIG. 14 within the data window 90. The episode interface 192 provides the episode name, start time, end time, type, real value, value limit, status, and by whom the episode was answered. As illustrated in FIG. 14, the status of each episode is unanswered meaning that the episodes have not been addressed by a technician or other authorized personnel. In comparison, FIG. 15 provides an episode interface 194 in which each episode has been answered, as indicated by the status column and the color coding of the episodes. An episode may be answered by selecting the start time associated with an episode. The user is then presented with an episode answer window 202, as illustrated in FIG. 16. This window provides the user with the option of identifying the particular episode reason codes and corrective actions.

With reference back to the navigation window 88 of FIG. 5, the user can view calibration information by selecting the Calibration and Constants application 112, under which the user is provided with the option of Calibration History. By selecting Calibrations History, the user is presented with the historical calibration interface 210 of FIG. 17. The historical calibration interface 210 provides relevant historical calibration data formatted according to channel. The user may select a channel to view detailed calibration information for that particular channel, as illustrated by detailed calibration window 220 of FIG. 18.

The user can generate and view reports by selecting one of the options under the Reports application 112 in navigation window 88. For example, the user can select the View Generated Reports option to view a list of already generated reports or select the Generate/Configure Reports option to generate and/or configure a report. If the user selects the View Generated Reports option, the user is presented with a report interface 230, as illustrated by FIG. 19, within the data window 90 of the main application interface 86. The user can select one of reports that was previously generated or the user can generate/configure a new report by selecting the Generate and/or Configure Reports button 232 of the menu bar 234 or by selecting the Generate/Configure Reports under the Reports application 112 in navigation window 88. By selecting the Generate and/or Configure Reports button 232, the user is presented with a report generation bar 236, as illustrated in FIG. 20. The report generation bar provides selectable parameters by which the user can define a particular time frame of data for one or more of the previously configured reports.

With reference back to the navigation window 88 of FIG. 5, the user can generate and view the quarterly EDR by selecting the 40CFR75 EDR/QA/QC application. This takes the user to the quarterly EDR interface 242 where the user can define the quarterly report to be generated. Because the present application is web-based, the user is able to move on to other screens of the web-based DAHS application or program windows on their computers. The generation of the report is being done in the background by the web-based DAHS application 24, and in particular, the web transaction module 42 The user can also view government regulated hourly average data by selecting the CEMS Hourly Details option under the 40CRFR75 Hourly Averages application 112 in the navigation window 88 of the main application interface 86. This takes the user to the CEMS hourly details interface 250, 252 as illustrated in FIGS. 22 and 23, respectfully. Of particular interest, the graphical illustration at the bottom of the data window 90 provides a quarters worth of data and the spikes represent periods of missing data. By clicking on the spikes, the data for that is presented in the remainder of the data window 90 above the graph.

Many modifications and other embodiments of the inventions set forth herein will come to mind to one skilled in the art to which these inventions pertain having the benefit of the teachings presented in the foregoing descriptions and the associated attachments. Therefore, it is to be understood that the inventions are not to be limited to the specific embodiments disclosed and that modifications and other embodiments are intended to be included within the scope of the present disclosure. Although specific terms are employed herein, they are used in a generic and descriptive sense only and not for purposes of limitation.

The invention claimed is:

1. A method for providing access to real-time emissions data over a distributed network, comprising:

receiving real-time emissions data associated with a first power generating plant;

receiving a request from a user to view at least one report, wherein the request is sent from a web browser;

generating a report based at least in part on the emissions data, wherein the report includes a plurality of real-time channel boxes, each for a corresponding channel and providing for that channel real-time measurement data, at least one running average and a relative indication of a current measurement value to at least one preset limit;

sending the report to the user, wherein the report is viewable with a web browser;

receiving a request from the user to view emissions data associated with a second power generating plant;

determining if the user is authorized to view emissions data associated with the second power generating plant; and if the user is authorized, then providing the user with access to the emissions data associated with the second power generation plant.

2. The method of claim 1, where the step of generating the report is in response to the request.

3. The method of claim 1, further comprising generating a plurality of reports.

4. The method of claim 1, wherein the report includes at least one of historical data and real-time data.

5. The method of claim 1, further comprising:

receiving a request from a user to view episode data, wherein the request is sent from a web browser;

generating a report presenting the requested episode data; and sending the report to the user, wherein the report is viewable with a web browser.

6. The method of claim 1, further comprising:

receiving a request from a user to view calibration data, wherein the request is sent from a web browser;

generating a report presenting the requested calibration data; and sending the report to the user, wherein the report is viewable with a web browser.

7. The method of claim 1, further comprising:

receiving a request from a user to view alarm data, wherein the request is sent from a web browser;

generating a report presenting the requested alarm data; and sending the report to the user, wherein the report is viewable with a web browser.

8. A system that provides access to real-time emissions data over a distributed network, comprising:

a data collection device that receives real-time emissions data associated with a first power generating plant;

a web-based data acquisition and handling system (DAHS) module that receives the emissions data from the data collection device and generates reports based at least in part on the emissions data; and at least one database that stores the emissions data and the reports;

wherein the web-based DAHS module is configured to receive a request from the user to view at least one report associated with the first power generating plant, and in response generates a web interface including the requested report and sends the web interface to the user for viewing with a browser application, wherein the report includes a plurality of real-time channel boxes, each for a corresponding channel and providing for that channel real-time measurement data, at least one running average and a relative indication of a current measurement value to at least one preset limit.

9. The system of claim 8, wherein the web-based DAHS module is configured to receive a request from the user to view emissions data associated with a second power generating plant, and in response determines if the user is authorized to view the emissions data associated with the second power generating plant, and if the user is authorized then providing the user with access to the emissions data associated with the second power generation plant.

10. The system of claim 8, wherein the at least one database includes one-minute logs of emission data.

11. The system of claim 8, wherein the report includes at least one of historical data and real-time data.

12. The system of claim 8, wherein the web-based DAHS module is configured to receive a request from a user to view episode data, wherein the request is sent from a web browser, generate a report presenting the requested episode data, and send the report to the user, wherein the report is viewable with a web browser.

13. The system of claim 8, wherein the web-based DAHS module is configured to receive a request from a user to view calibration data, wherein the request is sent from a web browser, generate a report presenting the requested calibration data, and send the report to the user, wherein the report is viewable with a web browser.

14. The system of claim 8, wherein the web-based DAHS module is configured to receive a request from a user to view alarm data, wherein the request is sent from a web browser, generate a report presenting the requested alarm data, and send the report to the user, wherein the report is viewable with a web browser.

15. A computer program product for providing access to real-time emissions data over a distributed network, said computer program product comprising:
   a computer usable medium having computer-readable code means embodied in said medium, said computer-readable code means comprising:
   computer readable program code means for receiving real-time emissions data associated with a first power generating plant;
   computer readable program code means for generating a plurality of reports based at least in part on the emissions data;
   computer readable program code means for receiving a request from a user to view at least one of the reports, wherein the request is sent from a web browser; and
   computer readable program code means for sending a report to the user, wherein the report is viewable with a web browser, wherein the report includes a plurality of real-time channel boxes, each for a corresponding channel and providing for that channel real-time measurement data, at least one running average and a relative indication of a current measurement value to at least one preset limit.

16. The computer program product of claim 15, further comprising:
   computer readable program code means for receiving a request from the user to view emissions data associated with a second power generating plant;
   computer readable program code means determining if the user is authorized to view emissions data associated with the second power generating plant; and
   computer readable program code means for if the user is authorized, then providing the
   user with access to the emissions data associated with the second power generation plant.

* * * * *